Figure 1:
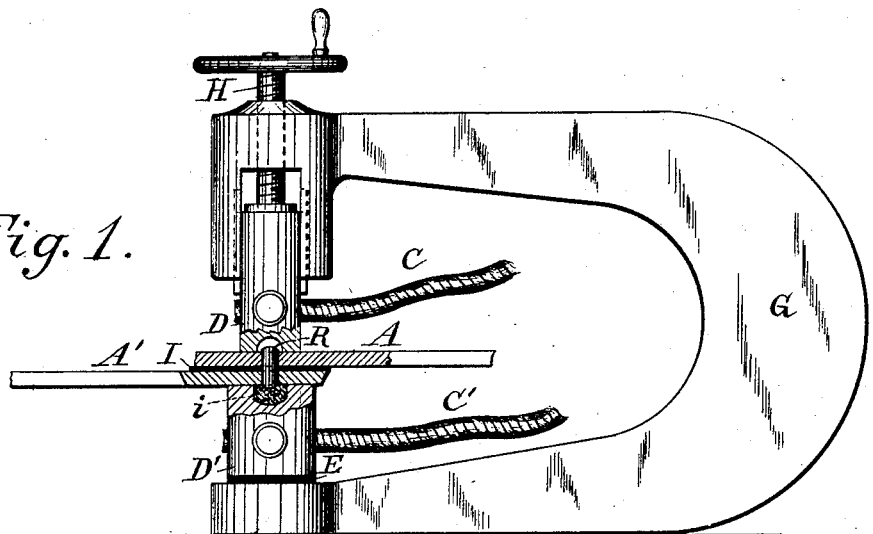

(No Model.)

M. W. DEWEY.
METHOD OF ELECTRIC RIVETING.

No. 432,727. Patented July 22, 1890.

WITNESSES:
C. L. Bendixon
J. J. Laass

INVENTOR:
Mark W. Dewey
BY
Duell, Laass & Duell
his ATTORNEYS

THE NORRIS PETERS CO., PHOTO-LITHO., WASHINGTON, D. C.

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRIC RIVETING.

SPECIFICATION forming part of Letters Patent No. 432,727, dated July 22, 1890.

Application filed April 24, 1890. Serial No. 349,275. (No model.)

*To all whom it may concern:*

Be it known that I, MARK W. DEWEY, of Syracuse, in the county of Onondaga, in the State of New York, have invented new and useful Improvements in Method of Electric Riveting, (Case No. 57,) of which the following, taken in connection with the accompanying drawings, is a full, clear, and exact description.

My invention relates to electric riveting, and is a method or process consisting, essentially, in interposing insulating material between the pieces or plates to be riveted together, then inserting the rivet into the rivet hole or holes, and then passing a heating electric current through and between the plates and rivet.

The object of my invention is to confine the current in its passage between the metal blocks or riveting-tools forming the terminals of an electric circuit to the rivet and metal body through which it passes, or, in other words, to direct or guide the current in a certain path through the work that will tend to produce more effective and economical results than heretofore.

In the usual methods of electric riveting heretofore employed the metal pieces or plates to be riveted together were laid one upon the other without insulating material between them, and then punched or drilled and the metallic rivet inserted in the rivet hole or holes. The metal blocks or terminals of an electric circuit were then brought into contact with the ends of the rivet and the current allowed to pass through said rivet and plates until the ends of the rivet were sufficiently softened, when it was set by pressure applied to its ends to form heads. The rivet was in direct contact with the electric terminals, and also with the plates through which it extended, and the current in its passage between the terminals naturally expanded and divided when it reached the plates, except at the projecting ends of the rivet in contact with the terminals. The ends alone of the rivet, therefore, were sufficiently heated, and the portion of the rivet-shank within the holes in the plates remained comparatively cool, as it received but a small part of the current and did not become properly welded or united to the walls of the rivet-hole. Consequently it was very necessary to form heads on the ends of the rivets by pressure in order to secure the plates together. It will be seen that a large part of the current was wasted by this method, especially when it was desired to unite the sides of the rivet to the metal body through which it passed, as the current had to pass through the work a long time. It is essential that the riveting operation be done as quickly as possible; otherwise, as the plates have usually a great radiating surface and good conductivity, the heated will be rapidly dissipated and wasted.

It will be apparent from the above that heretofore an electric riveting operation depended largely upon the resistance derived by the ends of the rivet, as the portion within the hole, with the metal body surrounding and in contact with it, formed a path for the current of very low resistance, which became heated, if heated at all, only by the conduction of heat from the highly-heated ends of the rivet. By my improved method I confine the current passing between the metal blocks, forming the terminals of the circuit, to a path of high resistance, so that the rivet-shank within the hole and the walls of the hole are both raised to a welding-temperature and completely united. The expansion of the rivet-shank and the metal body surrounding it, produced by the heat of the current, is alone sufficient to effect the union of the parts without pressure of any kind. Nevertheless, if desired, suitable pressure may be applied also, as when a heading operation is required. A heading operation is not necessary with my process, as the rivet is firmly welded to the metal body or plates throughout its length and they become one piece, thus saving all heading and countersinking.

It has been proposed, in order to confine the current to the rivet, to cover the rivet-shank with insulating material, but this entirely prevents the union of the rivet with the metal body, and the plates are held together only by the rivet-head, which is objectionable.

In practicing my improved process I first coat the surface of one of the plates in any suitable manner at all points where it will lap on or come in contact with the other plate, when in position to be riveted, with suitable insulating material—such as a mineral paint, lead, or an oxide, or an enamel. Then the rivet R is inserted in the holes therein, and the terminals of the electric circuit are brought in contact with the bare sides of the plates, preferably at points near and surrounding the ends of the rivet, which latter are insulated from said terminals in any desired manner. By this arrangement the current is passed from one of the terminals or metal blocks holding or pressing the plates together into one of the plates in the vicinity of the rivet from the said plate to and through the rivet to the other plate, and then from the latter plate in the vicinity of said rivet to the other terminal or metal block. The method may be practiced by means of apparatus varied in form and construction and different from that shown in the drawings, although this is suitable for carrying out my method.

Figure 2:
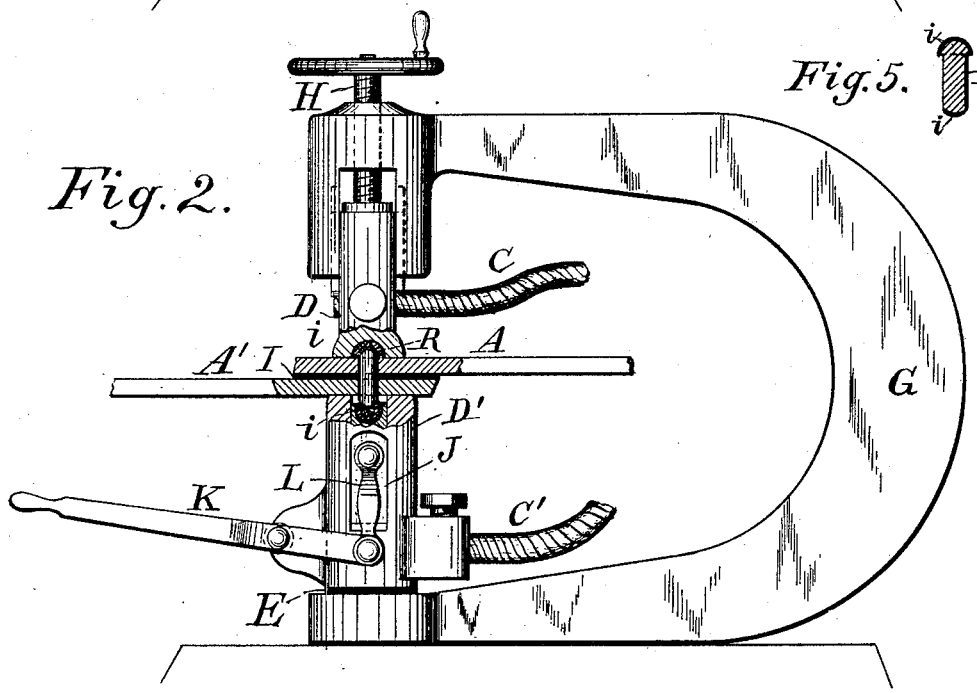
Figure 5:
Figure 3:
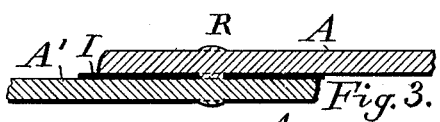
Figure 4:
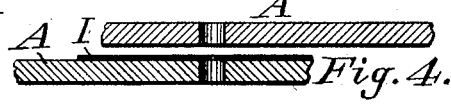

In the accompanying drawings, Figure 1 represents one form of apparatus for riveting by my method, and Fig. 2 is another form to be employed when pressure is applied to the ends of the rivet. Fig. 3 is a sectional view of the plates and rivet after the operation has been effected. Fig. 4 is a sectional view of the plates after the insulating material has been applied and the holes drilled, but before the plates are placed together and the rivet inserted in position; and Fig. 5 is a section of a rivet having insulating material on its ends.

Like letters of reference indicate corresponding parts.

Referring now more specifically to the drawings, A and A' indicate two metal plates to be secured together by means of a rivet R, placed in a hole or holes passing through lapped portions of the plates having insulating material I between them, and D and D' indicate two metal blocks or terminals of a suitable electric circuit and of sufficient size to conduct a current of large volume without becoming greatly heated thereby.

The heating-current employed may be derived from any suitable source or may be the same as that described in my prior patent, No. 402,416, dated April 30, 1889. The current is conveyed by means of cables of good conductivity C and C' to the blocks D and D', which are insulated one from the other, as shown at E, to prevent the current short-circuiting around the work. The metal block D is in the shape of a plunger supported by the end of the upper arm of the frame G and may be raised and lowered upon the work as desired by means of the screw H. The block D' is stationary, forms an anvil, is connected with the cable C', and is fixed to but insulated from the end of the lower arm of the frame G. The conducting-faces of the blocks D and D' are parallel to and opposite each other, and D is movable toward and from block D'. After the plates are placed together in position and the rivet inserted the latter is placed between the blocks, and the upper block D is forced down by means of the screw H upon said plates to hold or press them together and at the same time make good electrical connection with the same. The upper block D is hollowed out on its conducting-surface, so that it does not come in contact with its end of the rivet, and the lower block is also hollowed out in a similar manner; but for convenience the hollow in this block is nearly or entirely filled with some refractory insulating material $i$. In Fig. 2 the upper block is also shown filled with the same material. When the said blocks are in position the current is allowed to flow, and on account of the insulation $l$ between the plates and the insulation on the ends of the rivet, the current is passed through the plates and rivet-blank, as before described, effecting a thorough union of the sides of the rivet to the plates or metal body surrounding it, as shown clearly in Fig. 3. When it is desired to upset or head the rivet slightly, a plunger J may be provided to work in the block D', as shown in Fig. 2 of the drawings, by means of a pivoted lever K, coupled at one end to said plunger by a link L. By depressing the handle of the lever K the plunger J is lifted and pressure is applied to the end of the rivet to upset or head the rivet or to perfect the union of the parts. The lapping surfaces of both plates may be coated with the insulating material I; but if one of them is coated, as indicated in Fig. 4, it will be sufficient for the purpose of my invention.

It will be obvious that an ordinary electric riveting apparatus may be employed, and the current passed through the rivet and plates, if desired, and with good results when the insulating material is interposed between the plates. Instead of using a rivet with bare ends and placing insulating material $i$ in the blocks when it is desired to make contact with the ends of said rivet during the operation, the ends of the rivet itself may be coated or covered with suitable insulating paint or enamel, as shown in Fig. 5.

Having described my invention, what I claim as new, and desire to secure by Letters Patent, is—

1. The herein-described method or process of electric riveting, consisting in interposing insulating material between the pieces or plates to be riveted together, then inserting the rivet into the rivet hole or holes, and then passing a heating electric current through the rivet and plate to unite the sides of the rivet to the metal body through which it passes.

2. The herein-described method or process of electric riveting, consisting in interposing insulating material between the pieces or plates to be riveted together, then inserting the rivet into the rivet hole or holes, then passing a heating electric current into one of the plates in the vicinity of the rivet from the said plate to and through the rivet to the other plate, and then from the latter plate in the vicinity of said rivet to unite the sides of the same to the metal body through which it passes.

3. The herein-described method of electric riveting, consisting in interposing insulating material between the plates, pressing the same together and heating the rivet inserted through the plates by a heavy electric current flowing through the rivet and plates to unite the sides of the rivet to the metal body through which it passes.

4. The herein-described method of electric riveting, consisting in interposing insulating material between the plates, pressing the same together, and heating the rivet inserted through the plates by a heavy electric current flowing through the rivet and plates to unite the sides of the rivet to the metal body through which it passes, and then applying pressure to perfect the union, as desired.

5. The herein-described method of electric riveting, consisting in interposing insulating material between the plates, pressing the same together, heating the rivet inserted through the plates by a heavy electric current flowing through the rivet and plates to unite the sides of the rivet to the metal body through which it passes, and then applying end pressure to the rivet to perfect the union of said parts.

6. The herein-described method or process of riveting, consisting in interposing insulating material between the plates and heating the rivet and plates electrically while in position to weld or unite the sides of the rivet to the metal body through which it passes.

7. The herein-described method or process of riveting, consisting in interposing insulating material between the pieces or plates to be riveted together, then inserting the rivet into the rivet hole or holes, insulating the ends of the rivet, then passing a heating electric current into one of the plates in the vicinity of the rivet from the said plate to and through the rivet to the other plate, and then from the latter plate in the vicinity of said rivet, to unite the sides of the same to the metal body through which it passes.

8. The herein-described method or process of riveting, consisting in interposing insulating material between the pieces or plates to be riveted together, then inserting the rivet into the rivet hole or holes, holding the plates together by applying metal blocks on each side, insulating the ends of the rivet from the blocks, then passing a heating electric current into one of the plates in the vicinity of the rivet from the said plate to and through the rivet to the other plate, and then from the latter plate in the vicinity of said rivet, to unite the sides of the same to the metal body through which it passes.

9. The herein-described method or process of riveting, consisting in interposing insulating material between the pieces or plates to be riveted together, then inserting the rivet into the rivet hole or holes, holding the plates together by applying metal blocks on each side, insulating the ends of the rivet from the blocks, then passing a heating electric current into one of the plates in the vicinity of the rivet from the said plate to and through the rivet to the other plate, and then from the latter plate in the vicinity of said rivet, to unite the sides of the same to the metal body through which it passes, and then applying pressure to perfect the union, as desired.

10. The herein-described method or process of riveting, consisting in interposing insulating material between the pieces or plates to be riveted together, then inserting the rivet into the rivet hole or holes, and then passing a heating electric current through and between the plates and rivets, to unite the sides of the same to the metal body through which it passes.

In testimony whereof I have hereunto signed my name this 22d day of April, 1890.

MARK W. DEWEY. [L. S.]

Witnesses:
C. H. DUELL,
H. M. SEAMANS.